United States Patent
Mori et al.

(10) Patent No.: US 10,790,905 B2
(45) Date of Patent: Sep. 29, 2020

(54) OPTICAL FIBER AND OPTICAL TRANSMISSION SYSTEM

(71) Applicant: NIPPON TELEGRAPH AND TELEPHONE CORPORATION, Tokyo (JP)

(72) Inventors: Takayoshi Mori, Tsukuba (JP); Taiji Sakamoto, Tsukuba (JP); Takashi Yamamoto, Tsukuba (JP); Kazuhide Nakajima, Tsukuba (JP); Masaki Wada, Tsukuba (JP); Azusa Urushibara, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/312,051

(22) PCT Filed: Jul. 4, 2017

(86) PCT No.: PCT/JP2017/024499
§ 371 (c)(1),
(2) Date: Dec. 20, 2018

(87) PCT Pub. No.: WO2018/008635
PCT Pub. Date: Jan. 11, 2018

(65) Prior Publication Data
US 2019/0386748 A1    Dec. 19, 2019

(30) Foreign Application Priority Data
Jul. 4, 2016 (JP) ................... 2016-132140

(51) Int. Cl.
*H04J 14/04*    (2006.01)
*H04B 10/2581*    (2013.01)
(Continued)

(52) U.S. Cl.
CPC ..... *H04B 10/2581* (2013.01); *G02B 6/02019* (2013.01); *H04B 10/50* (2013.01); *H04B 10/60* (2013.01)

(58) Field of Classification Search
CPC ...... H04J 14/04; H04J 14/02; H04B 10/2581; H04B 10/2507; G02B 6/0288; G02B 6/0365; G02B 6/02; G02B 6/02019
(Continued)

(56) References Cited

U.S. PATENT DOCUMENTS

| | | | |
|---|---|---|---|
| 5,329,607 A | | 7/1994 | Kamikawa et al. |
| 5,651,080 A | * | 7/1997 | Chu .................. G02B 6/14 385/28 |

(Continued)

FOREIGN PATENT DOCUMENTS

| | | |
|---|---|---|
| CN | 101277153 A | 10/2008 |
| EP | 1116968 A1 | 7/2001 |

(Continued)

OTHER PUBLICATIONS

Extended European Search Report regarding EP178242384, dated Oct. 15, 2019.
(Continued)

*Primary Examiner* — Hanh Phan

(57) ABSTRACT

The optical fiber according to the present disclosure is an optical fiber having a pure silica core which is a step index core through which an LPm1 mode with an effective area of 250 μm² or more is propagated by setting a relative refractive index difference to 0.60% or less, considering an effective cutoff condition, and only 2 or more modes or the LPm1 mode are propagated, with the optical fiber as the transmission line.

4 Claims, 16 Drawing Sheets

(51) Int. Cl.
    *G02B 6/02*     (2006.01)
    *H04B 10/50*     (2013.01)
    *H04B 10/60*     (2013.01)

(58) Field of Classification Search
    USPC ..... 398/79, 44, 43, 158, 159, 141, 142, 143,
                  398/140, 81, 83, 147; 385/24, 123, 124,
                                385/125, 126, 127, 128
    See application file for complete search history.

(56) References Cited

U.S. PATENT DOCUMENTS

| | | | | |
|---|---|---|---|---|
| 2012/0294576 | A1* | 11/2012 | Li | G02B 6/0288 |
| | | | | 385/124 |
| 2013/0071115 | A1* | 3/2013 | Bennett | H04B 10/2581 |
| | | | | 398/44 |
| 2015/0030325 | A1* | 1/2015 | Chang | H04J 14/04 |
| | | | | 398/44 |
| 2015/0043910 | A1* | 2/2015 | Koebele | H04J 14/04 |
| | | | | 398/44 |
| 2016/0216440 | A1* | 7/2016 | Imamura | G02B 6/0288 |

FOREIGN PATENT DOCUMENTS

| | | |
|---|---|---|
| EP | 2674795 A1 | 12/2013 |
| EP | 3056931 A1 | 8/2016 |
| JP | 5394344 B2 | 1/2014 |
| JP | 2014-517343 A | 7/2014 |
| JP | 2014-530374 A | 11/2014 |
| JP | 2015-045703 A | 3/2015 |
| JP | 2015-096938 A | 5/2015 |
| WO | WO-2012/108467 A1 | 8/2012 |
| WO | WO-2012/158667 A1 | 11/2012 |
| WO | WO-2013/039751 A1 | 3/2013 |

OTHER PUBLICATIONS

Chinese Office Action from counterpart CN2017800401032, dated Feb. 3, 2020.
S.Ö. Arik et al., "Effect of mode coupling on signal processing complexity in mode-division multiplexing", J. Lightwave Technol. 31 (3) (2013) 423-431.
Philippe Genevaux et al., "6-mode Spatial Multiplexer with Low Loss and High Selectivity for Transmission over Few Mode Fiber", in Optical Fiber Communication Conference, OSA Technical Digest (online) (Optical Society of America, 2015), paper W1A.5.
Christian Simonneau et al., "5-mode Amplifier with Low Modal Crosstalk for Spatial Mode Multiplexing Transmission with Low Signal Processing Complexity", in Optical Communication (ECOC, 2015), 41th European Conference and Exhibition, Sep. 2015, paper We.2.4.2.
Pierre Sillard et al., "Few-Mode Fiber for Uncoupled Mode-Division Multiplexing Transmissions", in Optical Communication (ECOC 2011), 37th European Conference and Exhibition, Sep. 2011, paper Tu.5.LeCervin.7.
M. Hirano et al., "Record Low Loss, Record High FOM Optical Fiber with Manufacturable Process", in Optical Fiber Communication Conference/National Fiber Optic Engineers Conference 2013, OSA Technical Digest (online) (Optical Society of America, 2013), paper PDP5A.7.
S. Makovejs et al., "Record-Low (0.1460 dB/km) Attenuation Ultra-Large $A_{eff}$ Optical Fiber for Submarine Applications", in Optical Fiber Communication Conference Post Deadline Papers, OSA Technical Digest (online) (Optical Society of America, 2015), Paper Th5A.2.
F. Yaman et al., "First Quasi-Single-Mode Transmission over Transoceanic Distance using Few-mode Fibers", in Optical Fiber Communication Conference Post Deadline Papers, OSA Technical Digest (online) (Optical Society of America, 2015), paper Th5C.7.
Abdullah Al Amin et al., "Dual-$LP_{11}$ mode 4×4 MIMO-OFDM transmission over a two-mode fiber", Opt. Express. 19 (17) (2011) 16672-16679.
Yasuyuki Kato et al., "Effective Cutoff Wavelength of the $LP_{11}$ Mode in Single-Mode Fiber Cables", IEEE Journal of Quantum Electronics, QE-17 (1) (1981) 35-39.
M. Bigot-Astruc et al., "Design and fabrication of weakly-coupled few-modes fibers", 2012 IEEE Photonics Society Summer Topical Meeting Series, Seattle, WA, 2012, pp. 189-190.
Yongmin Jung et al., Reconfigurable Modal Gain Control of a Few-Mode EDFA Supporting Six Spatial Modes (IEEE Photonics Technology Letters, vol. 26, No. 11, Jun. 1, 2014).
International Search Report for PCT/JP2017/024499, ISA/JP, dated Oct. 3, 2017, with English translation translation attached.

* cited by examiner

FIG. 3C  5 LP
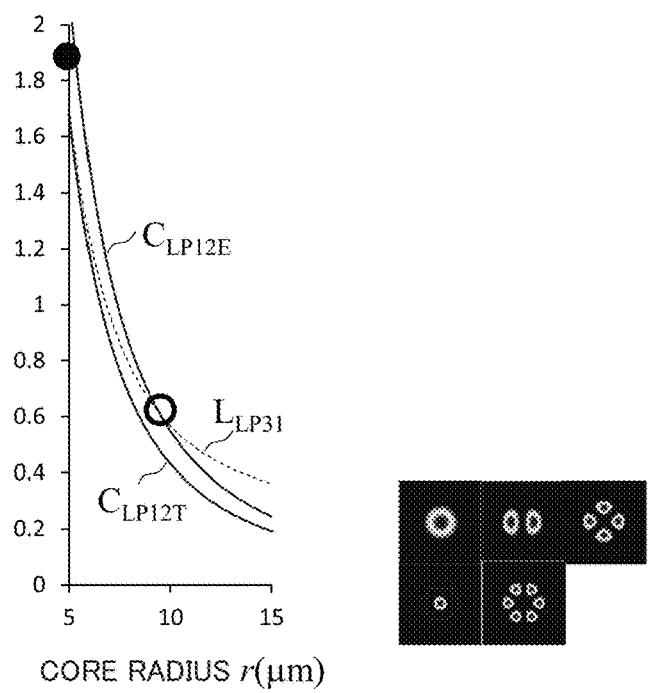
FIG. 3D  6 LP
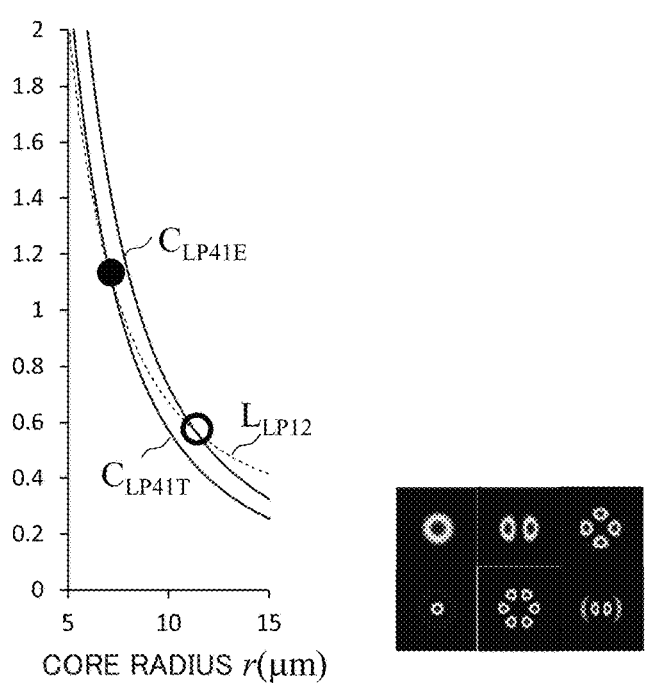

OPTICAL FIBER AND OPTICAL TRANSMISSION SYSTEM

CROSS-REFERENCE TO RELATED APPLICATIONS

This application is a 371 U.S. National Stage of International Application No. PCT/JP2017/024499, filed on Jul. 4, 2017. Priority is claimed on Japanese Patent Application No. 2016-132140, filed on Jul. 4, 2016. The disclosures of the above applications are incorporated herein by reference.

TECHNICAL FIELD

The present disclosure relates to an optical fiber in a mode multiplexed optical transmission system using a multi-mode optical fiber through which a plurality of propagation modes are propagated as a transmission line, and an optical transmission system thereof.

BACKGROUND ART

A multi-mode optical fiber using a plurality of propagation modes has been proposed as a technique to increase transmission capacity. In particular, mode multiplexed transmission using a plurality of propagation modes is attracting attention as a new large capacity transmission system because the transmission capacity can be improved by several times the number of modes.

In transmission using the multi-mode optical fiber, since modal crosstalk occurs in the transmission line, a multiple input multiple output (MIMO) equalizer is used at the receiving end as a compensation device. However, when the group delay difference between modes (differential mode delay: hereinafter referred to as DMD) at the receiving end is large, the load of digital processing (DSP) related to MIMO increases, and in order to realize long distance transmission, the load of DSP needs to be reduced (see, for example, NPL 1). Therefore, in order to mitigate the influence of DMD, an optical transmission system using a mode multiplexer and demultiplexer having a high mode extinction ratio, and an optical fiber transmission line in which coupling between modes is suppressed as much as possible has been proposed (for example, see NPLs 2 and 3).

In order to suppress coupling between modes, a step index core optical fiber has been proposed (see, for example, NPL 4). By using a mode multiplexer and demultiplexer having a high mode extinction ratio and an optical fiber transmission line in which coupling between modes is suppressed, it is possible to suppress compensation for modal crosstalk by MIMO DSP at the receiving end and to restore signals with the same level of the DSP load as in the optical transmission system using a single-mode fiber as a transmission line in the related art.

Note that the "single-mode optical fiber" and the "multi-mode optical fiber" described in the present specification respectively refer to an optical fiber that propagates an optical signal to be transmitted in a single-mode and an optical fiber that propagates it in multiple modes at the wavelength of the optical signal.

CITATION LIST

Patent Literature

Non-Patent Literature

[NPL 1] S. O. Arik et al., "Effect of mode coupling on signal processing complexity in mode-division multiplexing", J. Lightwave Technol. 31 (3) (2013) 4 23-43 1.

[NPL 2] Philippe Genevaux et al., "6-mode Spatial Multiplexer with Low Loss and High Selectivity for Transmission over Few Mode Fiber", in Optical Fiber Communication Conference, OSA Technical Digest (online) (Optical Society of America, 2015), paper W1A. 5.

[NPL 3] Christian Simonneau et al., "5-mode Amplifier with Low Modal Crosstalk for Spatial Mode Multiplexing Transmissive with Low Signal Processing Complexity", in Optical Communication (ECOC 2015), 41st European Conference and Exhibition, September 2015, paper We. 2.4.2

[NPL 4] Pierre Sillard et al., "Few-Mode Fiber for Uncoupled Mode-Division Multiplying Transmission", in Optical Communication (ECOC 2011), 37th European Conference and Exhibition, September 2011, paper Tu. 5. LeCervin. 7.

NPL 5: M. Hirano, T. Haruna, Y Tamura, T. Kawano, S. Ohnuki, Y. Yamamoto, Y. Koyano, and T. Sasaki, "Record Low Loss, Record High FOM Optical Fiber with Manufacturable Process," in Optical Fiber Communication Conference/National Fiber Optic Engineers Conference 2013, OSA Technical Digest (online) (Optical Society of America, 2013), paper PDP 5A. 7.

[NPL 6] S. Makovejs, C. Roberts, F. Palacios, H. B. Matthews, D. A. Lewis, D. T. Smith, P. G Diehl, J. J. Johnson, J. D. Patterson, C. Towery, and S. Ten, "Record-Low (0.1460 dB/km) Attenuation Ultra-Large Aeff Optical Fiber for Submarine Applications", in Optical Fiber Communication Conference Post Deadline Papers, OSA Technical Digest (online) Optical Society of America, 2015), paper Th5A.2.

[NPL 7] F. Yaman, S. Zhang, Y. Huang, E. Ip, J. D. Downie, W. A. Wood, A. Zakharian, S. Mishra, J. Hurley, Y Zhang, I. B. Djordjevic, M. Huang, E. Mateo, K. Nakamura, T. Inoue, Y Inada, and T. Ogata, "First Quasi-Single-Mode Transmission over Transoceanic Distance Using Few-mode Fibers", in Optical Fiber Communication Conference Post Deadline Papers, OSA Technical Digest (online) (Optical Society of America, 2015), paper Th5C. 7.

[NPL 8] Abdullah Al Amin, An Li, Simin Chen, Xi Chen, Guanjun Gao and William Shieh, "Dual-LP11 mode 4×4 MIMO-OFDM transmission over a two-mode fiber", Opt. Express. 19 (17) (2011) 16672-16679.

[NPL 9] Yasuyuki Kato, Kenichi Kitayama, Shigeyuki Seikai, and Naoya Uchida, "Effective Cutoff Wavelength of the LP11 Mode in Single-Mode Fiber Cables", J. Lightwave Technol. QE-17 (1) (1981) 35-39.

[NPL 10] M. Bigot-Astruc, D. Boivin and P. Sillard, "Design and fabrication of weakly-coupled few-modes fibers", 2012 IEEE Photonics Society Summer Topical Meeting Series, Seattle, Wash., 2012, pp. 189-190.

[NPL 11] Yongmin Jung et al., Reconfigurable Modal Gain Control of a FEW-Mode EDFA Supporting Six Spatial Modes (IEEE PHOTONICS TECHNOLOGY LETTERS, Vol. 26, NO. 11, Jun. 1, 2014)

SUMMARY OF THE INVENTION

Technical Problem

However, because signals are transmitted in LP01, LP11, and LP21 modes in NPL 2, and in LP01, LP11, LP21 and LP02 modes in NPL 3, the MIMO DSP load has the same level as in the single-mode transmission system in the related art, but the span length is at most 40 km. In order to increase the propagation distance, reduction of modal crosstalk is still a problem. Although the fiber described in NPL 4 is used for the transmission line, the propagation loss is 0.218 dB/km, which is larger than the propagation loss of the single-mode fiber in the related art. This is because $GeO_2$ is highly doped (the relative refractive index difference is 0.67%) as compared with the single-mode fiber (the relative refractive index difference is about 0.35%) in the related art, and the Rayleigh scattering loss is increased.

For further extension, it is necessary to increase the input intensity to the optical fiber transmission line in order to obtain a sufficient signal-to-noise ratio at the receiving end, but in order to suppress signal deterioration due to a non-linear effect caused by an increase in the light intensity, it is desirable to increase an effective area. The effective area of the LP01 mode which is the fundamental mode in NPL 4 is 124 $\mu m^2$. In order to further extend an interval without relaying, low crosstalk, low loss, and low nonlinearity (increase in an effective area) of an optical fiber transmission line are desired.

Therefore, in order to solve the above problem, an object of the present disclosure is to provide a pure silica core optical fiber in which for example, fluorine is doped in a clad portion and a relative refractive index difference is reduced in order to propagate only a specific mode (for example, an LPm1 mode, where m is an integer of 1 or more), and an optical transmission system including the same.

In NPLs 5 and 6, optical fibers with low loss of 0.149 dB/km or 0.146 dB/km have been proposed as single-mode fibers by using a pure silica core. However, since these fibers propagate only the single mode, the fibers are not used for mode multiplexed transmission for increasing the capacity.

In NPL 7, only the LP01 mode which is the fundamental mode is propagated among the optical fiber transmission lines through which the LP01 mode and the LP11 mode propagate, and long distance transmission of 6600 km has been demonstrated. However, since only the fundamental mode is transmitted, it is not used for mode multiplexed transmission for increasing the capacity.

In NPL 8, a transmission system that propagates only the LP11 mode, which is the first higher-order mode, among the optical fiber transmission lines through which the LP01 mode and the LP11 mode propagate has been reported. The structure of the transmission optical fiber is a step index core structure, the core radius is 4.1 $\mu m$, and the relative refractive index difference is 0.54%. The propagation loss is 0.25 dB/km, which is larger than the propagation loss of the single-mode fiber in the related art. In addition, the transmission distance is reported to be 26 km, and it is desired to reduce the loss of the optical fiber transmission line by optimum design of the optical fiber structure.

Solution to Problem

In order to achieve the above object, in the optical fiber according to the present disclosure, an optical fiber structure is designed in consideration of an effective cutoff wavelength in order to propagate a plurality of modes and reduce a relative refractive index difference. In designing a multi-mode optical fiber, it is important to guarantee that a specific number of modes are propagated in the wavelength range of the optical signal to be transmitted, and the cutoff wavelength of unnecessary modes which are not propagated in the supposed wavelength range is a basic parameter of a multi-mode optical fiber.

In NPL 9, since the loss of unnecessary modes increases in the vicinity of the cutoff wavelength in an actual fiber, in theory, it is reported that only a desired mode is guided even in a wavelength region on the shorter wavelength side from a cutoff wavelength where the waveguide of a higher order mode is possible. In order to achieve the above object, the optical transmission system according to the present disclosure includes a transmitter, a mode multiplexer that excites and multiplexes only a specific mode (for example, an LPm1 mode) by using an optical fiber through which the plurality of modes are propagated as a transmission line, an amplifier, a mode demultiplexer that demultiplexes only the specific mode and converts it into a fundamental mode (LP01 mode), and a receiver. Thus, modal crosstalk is suppressed and the load on the DSP can be reduced.

Therefore, according to the present disclosure, it is possible to provide an optical transmission system capable of increasing the transmission capacity, extending the transmission distance, and reducing the DSP load, while suppressing modal crosstalk, by reducing a propagation loss in consideration of an effective cut-off wavelength, and propagating only two or more modes or only a specific mode (an LPm1 mode, where m is an integer of 1 or more) in a transmission line using an optical fiber having an increased effective area.

The optical fiber according to the first aspect of the present disclosure has a pure silica core, is a step index type of a refractive index distribution of a clad with respect to the core, and has a predetermined V value at which an LPm1 mode (m is an integer of 1 or more) is propagated.

m may be 1 and the predetermined V value may be greater than 3.8 and less than 4.3, or m may be 2 and the predetermined V value may be greater than 5.1 and less than 5.8, or m may be 3 and the predetermined V value may be greater than 6.3 and less than 7.1, or m may be 4 and the predetermined V value may be greater than 7.1 and less than 7.8.

The predetermined V value may be determined based on the effective refractive index difference of the lowest order mode among unnecessary modes.

An optical transmission system according to a second aspect of the present disclosure includes an optical transmitter that transmits signal light; a mode exciter that excites the signal light into an LPm1 (m is an integer of 1 or more) mode; a transmission line including the optical fiber according to any one of the first aspect to the third aspect through which the signal light of the LPm1 mode is propagated, a mode demultiplexer that demultiplexes two degenerate modes of the LPm1 mode and converts the degenerate modes into fundamental modes, and an optical receiver that receives the demultiplexed signal light of each fundamental mode.

An optical transmission system according to a third aspect of the present disclosure includes N (N is an integer of 2 or more) optical transmitters that transmit signal light with N single-mode optical fibers, a mode multiplexer that excites the signal light from each optical transmitter into N different modes among the LPm1 (m is an integer of 1 or more) modes and multiplexes the signal light of each mode, a transmission line including the optical fiber according to any one of the first aspect to the third aspect through which a multiplexed signal from the mode multiplexer is propagated, a mode demultiplexer that converts the N LPm1 modes propagating through the transmission line into N fundamental modes and performs demultiplexing, and an optical receiver that receives signal lights of the respective demultiplexed fundamental modes.

The above disclosures can be combined where possible.

Advantageous Effects of Invention

According to the optical fiber and the optical transmission system according to the above-described aspect of the present disclosure, there is provided a transmission system in which low crosstalk, low loss, and low nonlinearity are realized by propagating two or more modes or only specific modes (LPm1 modes, where m is an integer of 1 or more) in a case where an optical fiber considering an effective cutoff wavelength is used as a transmission line, an increase in an MIMO DSP load in mode multiplexed transmission is mitigated, and a transmission distance is increased.

BRIEF DESCRIPTION OF DRAWINGS

FIG. 3C is a diagram for explaining an optimum structure of a core radius and a relative refractive index difference of the multi-mode optical fiber according to the first embodiment.

FIG. 3D is a diagram for explaining an optimum structure of a core radius and a relative refractive index difference of the multi-mode optical fiber according to the first embodiment.

DESCRIPTION OF EMBODIMENTS

Figure 1:
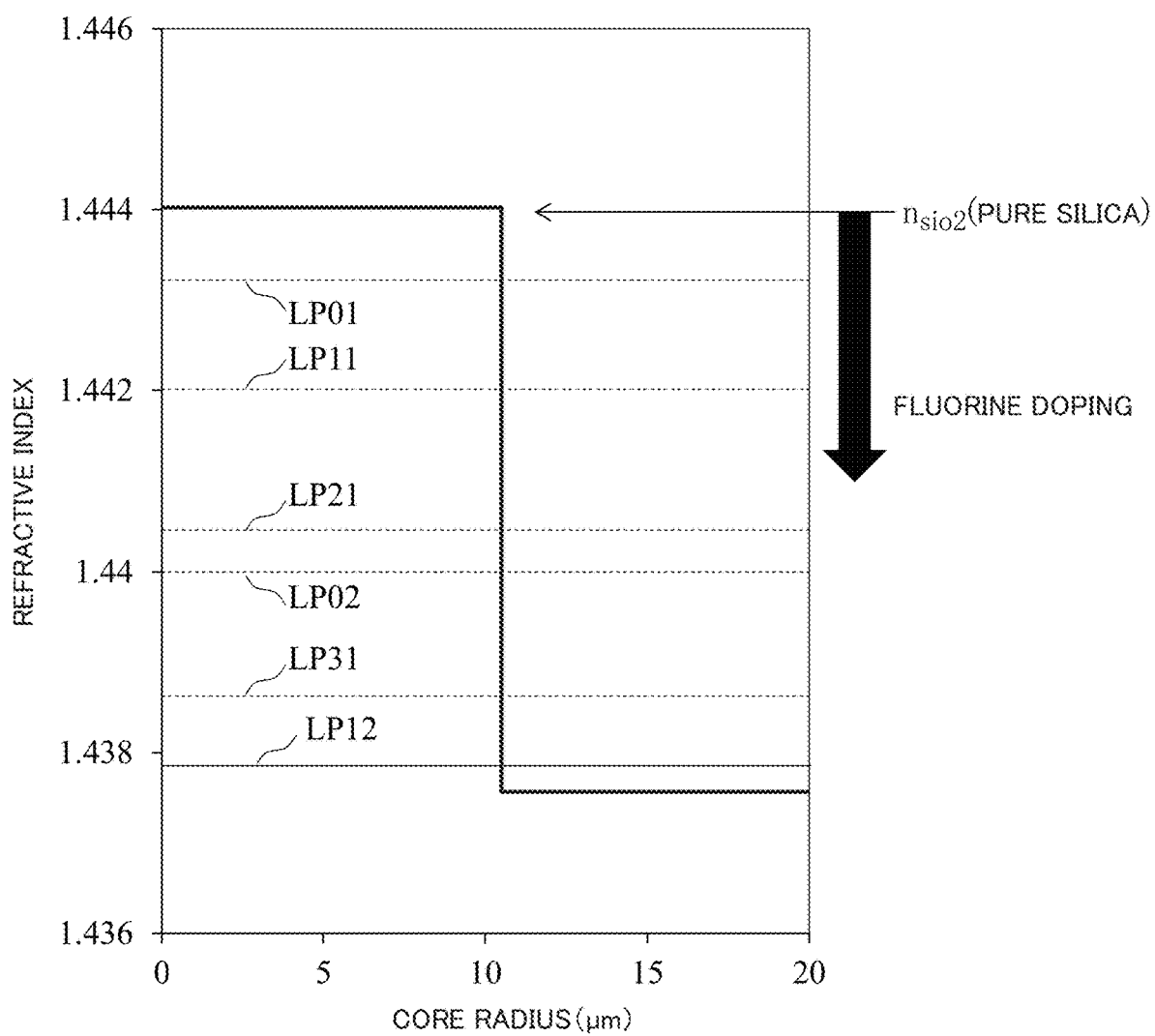
FIG. 1 is a diagram for explaining an example of a refractive index distribution of an optical fiber according to a first embodiment.

Hereinafter, embodiments of the present disclosure will be described in detail with reference to the accompanying drawings. The present disclosure is not limited to the embodiments described below. The embodiments are only examples, and the present disclosure can be implemented in various modified and improved forms based on knowledge of those skilled in the art. The same reference numerals in the present specification and drawings denote the same constituent elements.

First Embodiment

FIG. 1 shows an example of a refractive index distribution of an optical fiber according to the present disclosure. A core of a step index shape is easy to design and manufacture. The optical fiber according to the present disclosure is characterized by being a core of pure silica. For example, in order to propagate the LP21 mode and realize low loss, the optical fiber needs to be designed so as to propagate up to an LP02 mode where the effective refractive index difference is almost the same. Compared with NPL 4, the core radius r is increased and the relative refractive index difference $\Delta$ is reduced. Further, the fiber according to the present disclosure theoretically has effective refractive indices of the LP31 mode and LP12 mode, but is considered not to propagate the modes in practice, as described above.

Figure 2:
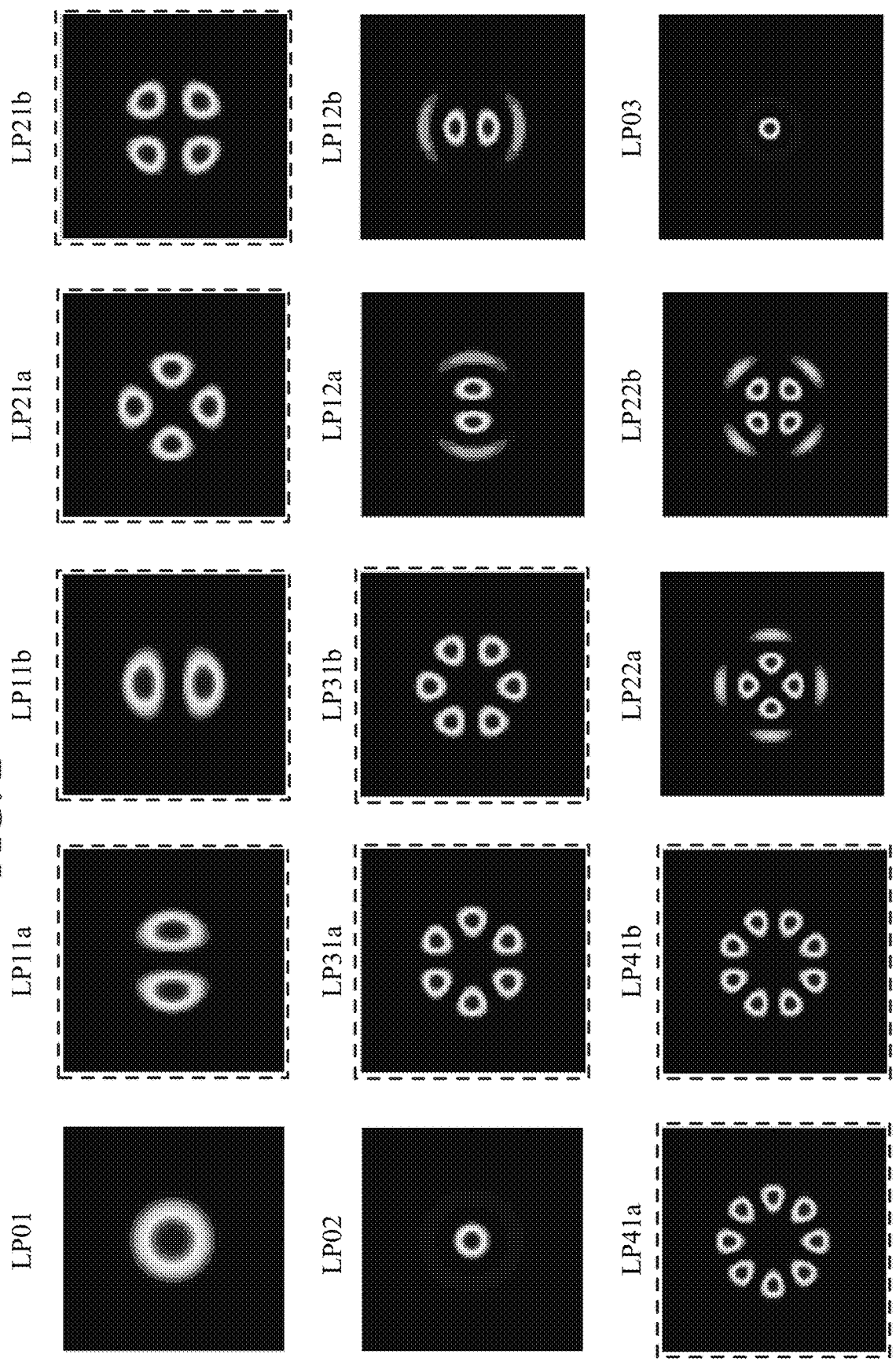
FIG. 2 is a diagram showing intensity distributions of modes propagating through the optical fiber according to the present disclosure.

FIG. 2 shows an intensity distribution in a mode propagating through the optical fiber according to the present disclosure. In the multi-mode fiber used in the mode multiplexed transmission, the signal is also transmitted in the higher-order mode. For example, as the core is increased, modes can be propagated in the order LP01, LP11, LP21, LP02, LP31, LP12, LP41, LP22, and LP03. In a normal single-mode fiber, the core radius is set to 4.5 μm and the relative refractive index difference is set to about 0.35% so that only the LP01 mode which is the fundamental mode propagates.

In the present disclosure, attention is paid particularly to the LPm1 mode (m is an integer of 1 or more) where effective area expansion can be expected. Considering degenerate modes, the LP11, LP21, LP31, LP41 modes each have two modes (for example, an LP11a mode and an LP11b mode in a case of the LP11 mode). The LP modes propagating through the optical fiber have two polarization modes of x and y polarizations (for example, an LP11ax mode, an LP11ay mode, an LP11bx mode, and an LP11by mode, in a case of the LP11 mode), and it is possible to transmit a signal in the respective degenerate modes or polarization modes. The related single mode is designed such that only the LP01 mode which is the fundamental mode is propagated at a desired wavelength range, and considering the polarization mode, only the LP01x mode and the LP01y mode are propagated. However, in the case where the 2LP mode optical fiber through which the LP01 mode and the LP11 mode propagate is used as a transmission line, there are six spatial modes in consideration of the degenerate mode and the polarization mode. Therefore, three times the transmission capacity in the case where the related optical fiber is used as a transmission line can be realized. For the sake of simplicity, only the LP mode is considered and discussed below.

In a case of designing a multi-mode fiber, it is a condition that a desired mode propagates in the wavelength of the optical signal to be transmitted. For example, considering a 2LP mode fiber in which the LP01 mode and the LP11 mode propagate in the C band (1530 to 1565 nm), it is necessary to consider the cutoff condition at 1565 nm of the LP21 mode, which is the lowest order mode of unnecessary modes, and the bending loss at 1565 nm of the LP11 mode. In the case of the step index core fiber, the bending loss of the desired highest mode is considered on the longer wavelength side where the bending loss becomes the largest. NPL 10 shows the design of a step index core up to a 7LP mode propagating in seven modes. However, this suggests that the number of modes increases and the propagation loss increases. When defining the number of propagation modes of the optical fiber, the normalized frequency V value is considered.

Here, the normalized frequency V value is expressed by the following equation.

$$V = \frac{2\pi r}{\lambda}\sqrt{n_{core}^2 - n_{clad}^2} \qquad \text{[Expression 1]}$$

λ is the wavelength, and n core and n clad are the refractive indices of the core and clad, respectively.

In the single-mode, V<2.4, in the 2LP mode, 2.4<V<3.8, in the 4LP mode, 3.8<V<5.1, in the 5LP mode, 5.1<V<5.5, in the 6LP mode, 5.5<V<6.4, and in the 7LP mode, 6.4<V<7.0. In addition to the V value, it is also necessary to consider the bending loss of the desired mode.

Figure 3A:
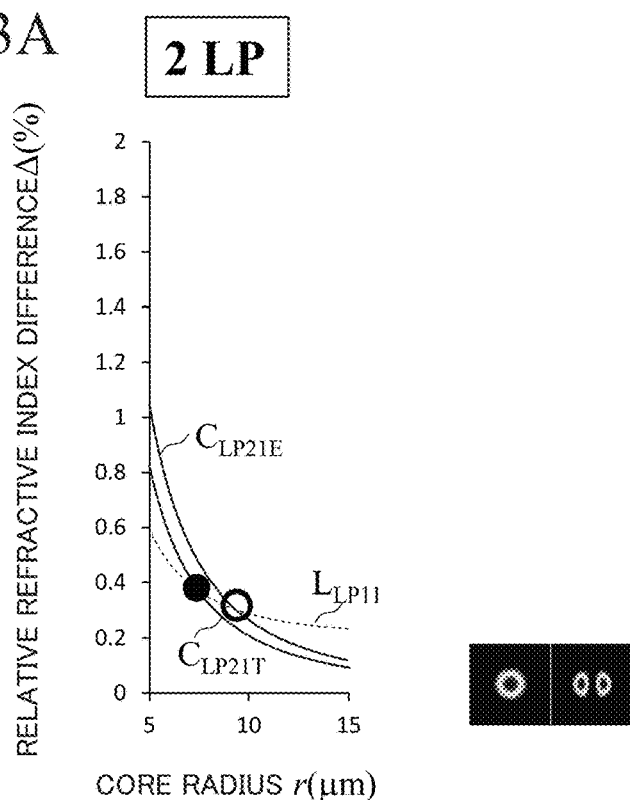
FIG. 3A is a diagram for explaining an optimum structure of a core radius and a relative refractive index difference of the multi-mode optical fiber according to the first embodiment.
Figure 3B:
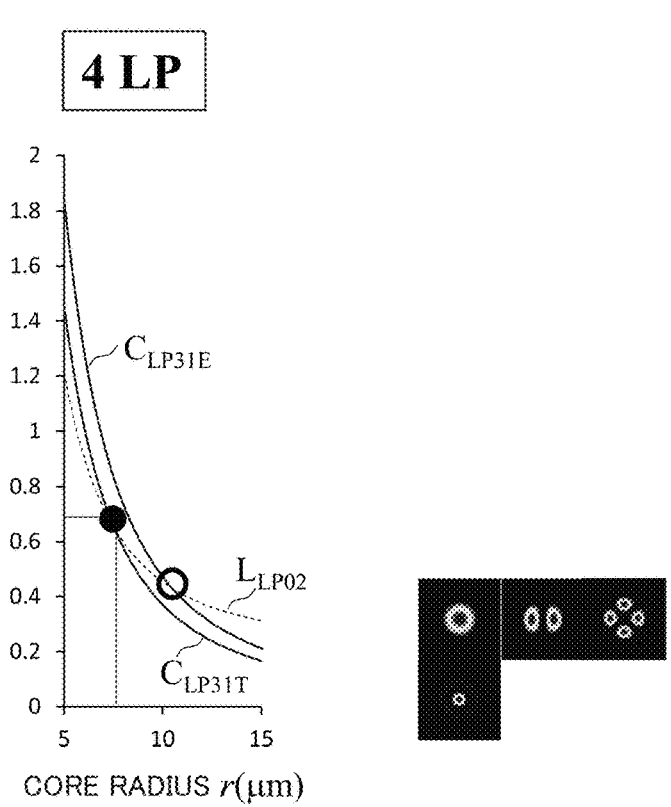
FIG. 3B is a diagram for explaining an optimum structure of a core radius and a relative refractive index difference of the multi-mode optical fiber according to the first embodiment.
Figure 3E:
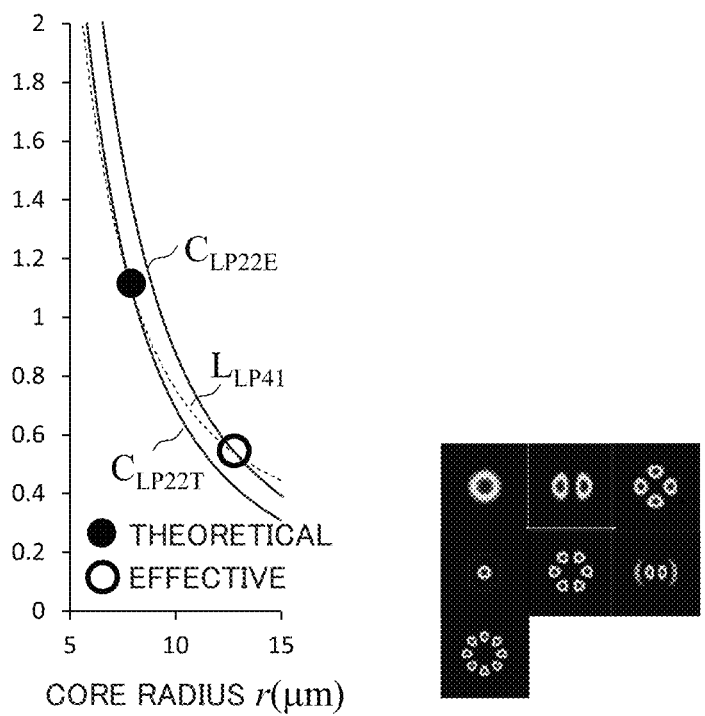
FIG. 3E is a diagram for explaining an optimum structure of a core radius and a relative refractive index difference of the multi-mode optical fiber according to the first embodiment.

FIGS. 3A to 3E show the relationship between the core radius r of the optical fiber and the relative refractive index difference Δ in the wavelength range C band. FIG. 3A shows a 2LP mode fiber, FIG. 3B shows a 4LP mode fiber, FIG. 3C shows a 5LP mode fiber, FIG. 3D shows a 6LP mode fiber, and FIG. 3E shows a 7LP mode fiber. Considering the current manufacturing technique, the relative refractive index difference Δ is limited to 2.0%. In the 2LP mode, the cutoff conditions CLP21E and CLP21T of the LP21 mode and the bending loss LLP11 of the LP11 mode are considered, as described above. In the 4LP mode, the cutoff conditions CLP31E and CLP31T of the LP31 mode and the bending loss LLP02 of the LP02 mode are considered. In the 5LP mode, the cutoff conditions CLP12E and CLP12T of the LP12 mode and the bending loss LLP31 of the LP31 mode are considered. In the 6LP mode, the cutoff conditions CLP41E and CLP41T of the LP41 mode and the bending loss LLP12 of the LP12 mode are considered. In the 7LP mode, the cutoff conditions CLP22E and CLP22T of the LP22 mode and the bending loss LLP41 of the LP41 mode are considered. Regarding the bending loss, with reference to ITU-TG652, attention is paid to the region where the bending radius R=30 mm, 0.1 dB/100 turns or less, at the wavelength of 1565 nm at which the bending loss becomes the largest for the desired mode.

For example, with respect to the design of the 2LP mode fiber, attention is paid to the wavelength 1565 nm of the LP11 mode which is the higher order mode with the largest bending loss, and a line of 0.1 dB/100 turns is indicated by a dotted line. As the relative refractive index difference is larger, the confinement of the mode increases, and thus the side above the dotted line is a region that satisfies the bending loss. With respect to the cutoff condition, attention is paid to the short wavelength (1530 nm) of the LP21 mode which is the lowest order mode of unnecessary modes, and because a smaller relative refractive index difference and a smaller the core radius represent less confinement, the LP21 mode does not propagate below the solid line. That is, the surrounded portion above the dotted line and below the solid line is the 2LP mode region.

Figure 4:
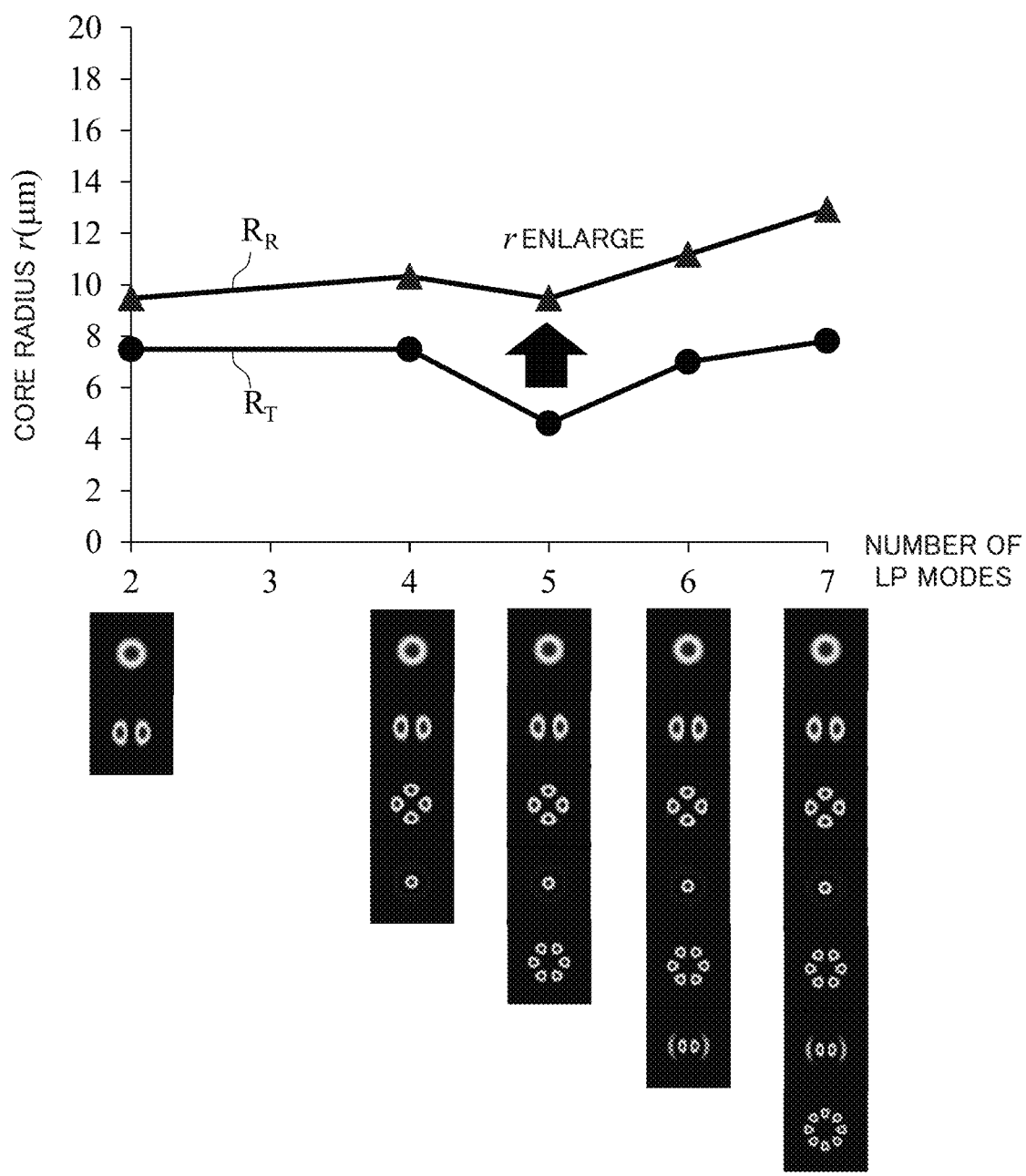
FIG. 4 is a diagram for explaining the number of LP modes to be propagated and the core radius in the optimum structure according to the first embodiment.
Figure 5:
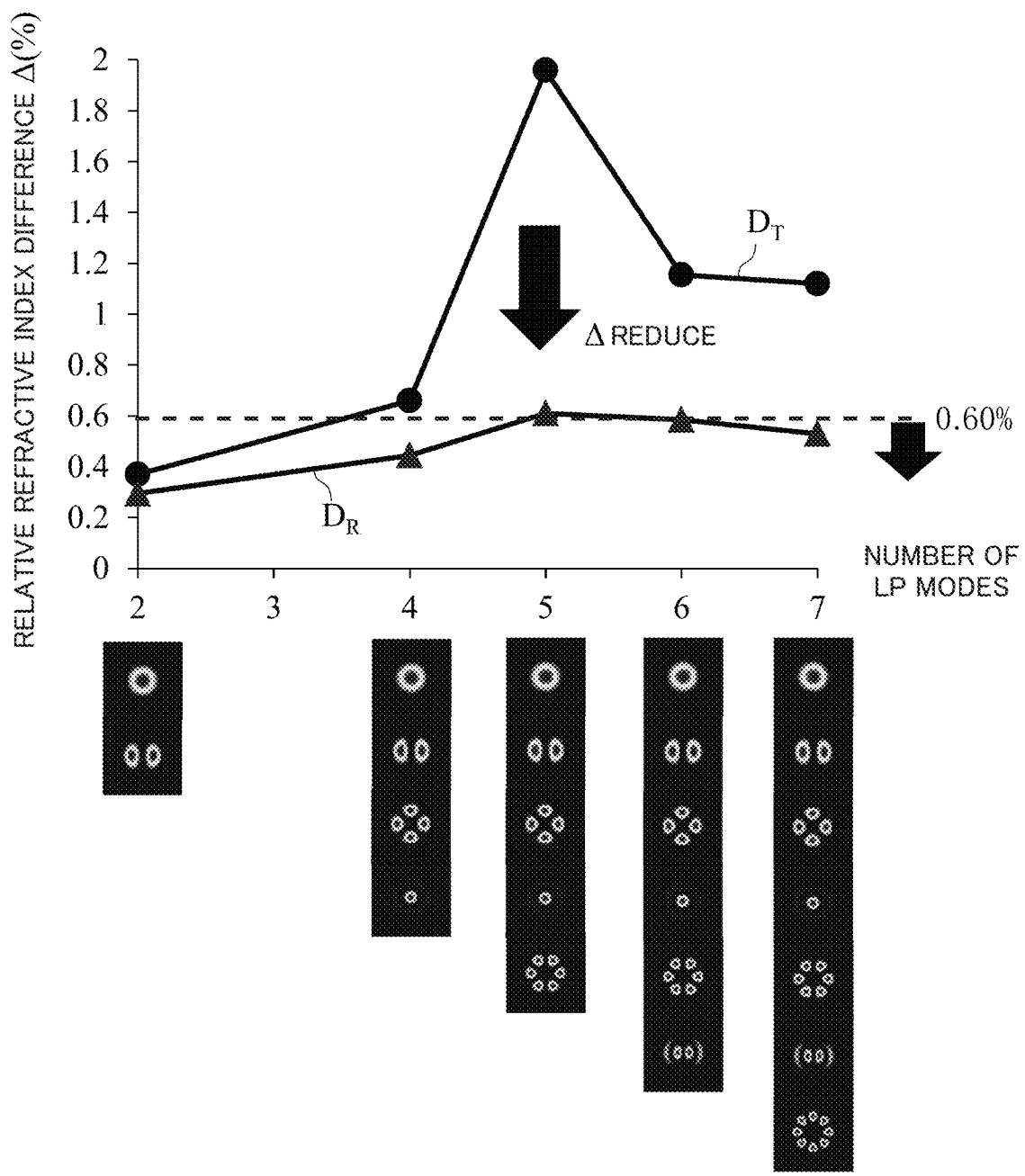
FIG. 5 is a diagram for explaining the number of LP modes to be propagated and the relative refractive index difference in the optimum structure according to the first embodiment.

Regarding the theoretical cutoff wavelength (λc) and the effective cutoff wavelength (λce), it is known from NPL 6 that a relationship of λc=Kλ×λce is established and Kλ is a value of 1.13 to 1.25. Here, Kλ is set to 1.13. For the region satisfying the cutoff condition of the unnecessary mode and the bending loss of the desired mode, the optimum structural parameters that can be expected to increase the effective area and to reduce the loss are arbitrary as long as the core diameter is large and the relative refractive index difference is small, and are obtained from the intersection points. FIGS. 4 and 5 show the core radius r and the relative refractive index difference Δ in the optimum structure of each multi-mode fiber.

As shown in FIG. 4, the value RR of the core radius r in consideration of the effective cutoff can be made larger than the value RT of the core radius r in consideration of the theoretical cutoff. As shown in FIG. 5, the value DR of the relative refractive index difference Δ in consideration of the effective cutoff can be made lower than the value DT of the relative refractive index difference Δ in consideration of the theoretical cutoff. Considering up to the 7LP mode, the relative refractive index difference Δ in consideration of the effective cutoff can be 0.60% or less. This suggests that the effective area can be increased and the loss can be reduced by designing the optical fiber in consideration of the effective cutoff condition rather than the theoretical cutoff condition.

Figure 6:
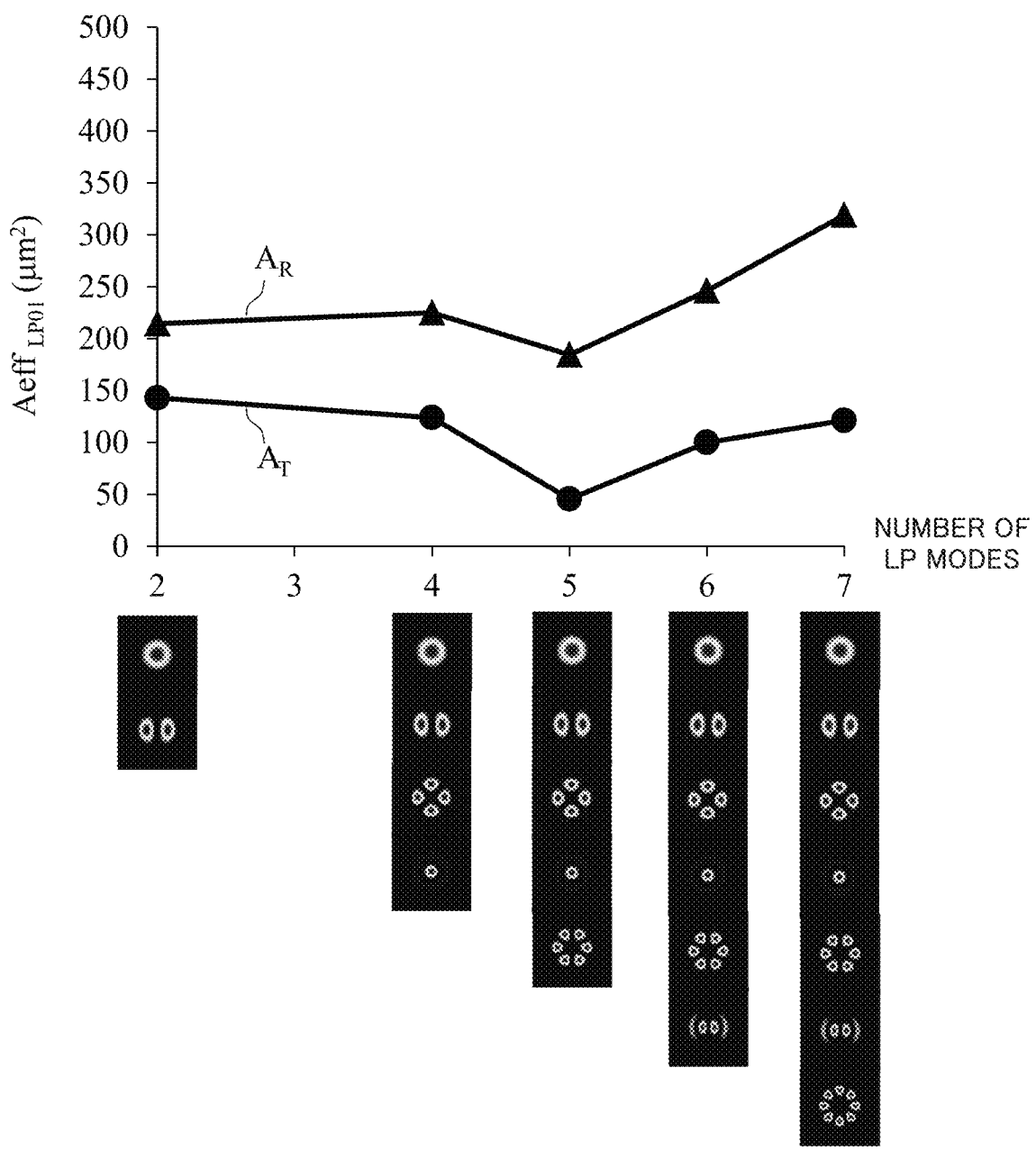
FIG. 6 is a diagram for explaining the number of LP modes to be propagated and the effective area of a fundamental mode in the optimum structure according to the first embodiment.

FIG. 6 shows the effective area (Aeff) of the LP01 mode, which is the fundamental mode in the optimum structure of each of the multi-mode fibers. The effective area AT of the optical fiber considering the theoretical cutoff is 150 μm$^2$ or less. On the other hand, it is understood that with respect to the effective area AR of the optical fiber considering the effective cutoff, the effective area of 200 μm$^2$ or more can be realized by excluding the 5LP mode design.

2LP mode design is suitable for the optical fiber structure for the LP11 mode, 4LP mode design is suitable for the optical fiber structure for the LP21 mode, 6LP mode design is suitable for the optical fiber structure for the LP31 mode, and 7LP mode design is suitable for the optical fiber structure for the LP41 mode. It is possible to use the LP11 and LP21 modes in a case of 4LP mode design, the LP11, LP21, and LP31 modes in a case of 6LP mode design, and the LP11, LP21, LP31, and LP41 modes in a case of 7 LP mode design. By using a spatial mode multiplexer with a high mode extinction ratio as shown in NPLs 2 and 3, it is possible to selectively use these modes.

In view of the above, when the V value is calculated from the optimum structure (FIGS. 4 and 5) considering the design of NPL 7 and the effective cutoff of the present disclosure, a step index structure in which the V value is $3.8<V<4.3$ in the case of the LP11 mode, $5.1<V<5.8$ in the case of the LP21 mode, $6.3<V<7.1$ in the case of the LP31 mode, and $7.1<V<7.8$ in the case of the LP41 mode is desirable.

If the above V value is satisfied, the same effect can be obtained not only in the refractive index distribution of the step index core, but also in any refractive index distribution such as a ring structure, a multistage step structure, and graded structure.

Second Embodiment

Hereinafter, an optical fiber and an optical transmission system for the LP21 mode will be described. Compared to other modes, the effective area can be increased in the LPm1 mode. In addition, although it is important to reduce modal crosstalk, the LPm1 mode has no peak in intensity at the center based on the intensity distributions in the modes shown in FIG. 2, so the overlapping of modes is small and low crosstalk can be expected. Considering up to the LP31 and LP41 modes, there is concern of crosstalk between the LP21 and LP31 modes and between the LP31 and LP41 modes, and the LP21 mode will be focused on at this time.

Figure 7:
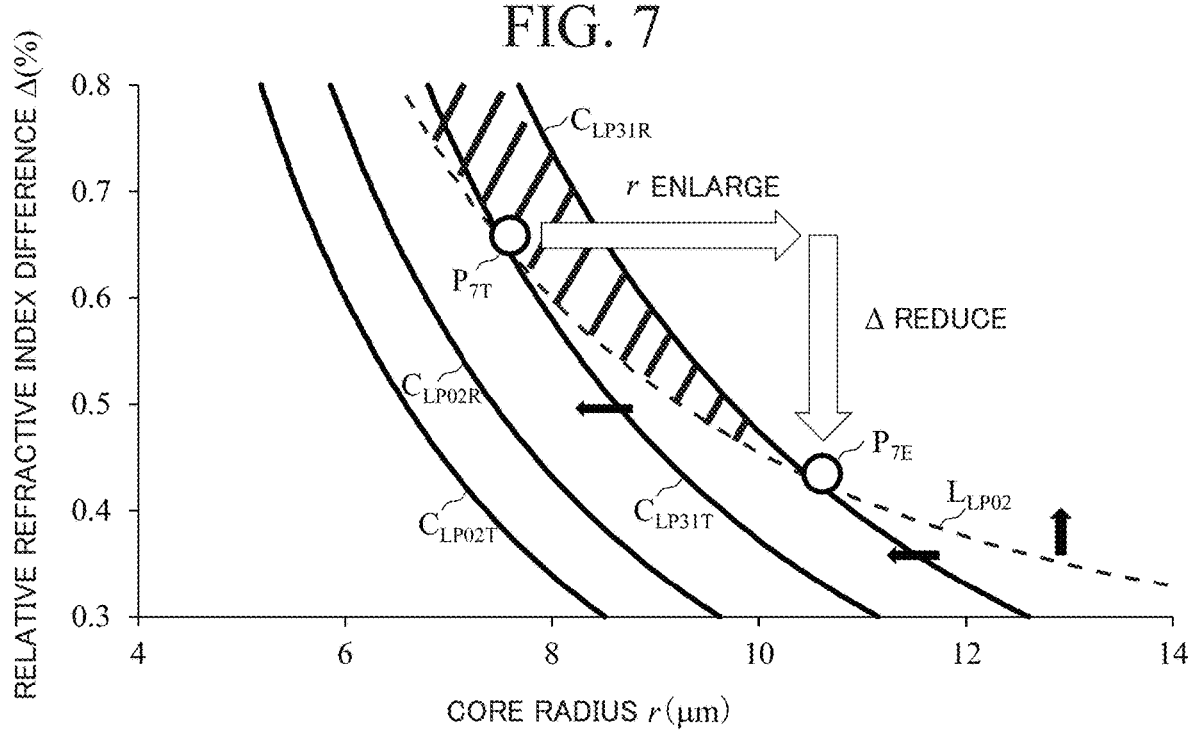
FIG. 7 is a diagram for explaining an optimum structure of a refractive index distribution of a 4LP mode fiber according to a second embodiment.

FIG. 7 shows a relationship between the core radius and the relative refractive index difference of the refractive index distribution of the 4LP mode fiber for the LP21 mode. CLP02T indicates the theoretical cutoff value at a wavelength of 1565 nm, CLP02E indicates an effective cutoff value at a wavelength of 1565 nm, CLP31T indicates the theoretical cutoff value at a wavelength of 1530 nm, and CLP31E indicates an effective cutoff value at a wavelength of 1530 nm. LLP02 is a line in which the light of the LP02 mode satisfies a wavelength of 1565 nm, a bending radius R=30 mm, and 0.1 dB/100 turns or less. As can be understood from comparison between CLP02T and CLP02E and comparison between CLP31T and CLP31E, effective cutoff design can increase the core radius compared with the theoretical cutoff design.

Although the hatched region is the 4LP mode region, considering the bending loss, it is preferable for the combination of the core radius and the relative refractive index difference to be an intersection point of the line LLP02 satisfying the bending loss of the LP02 mode and the line satisfying the effective cutoff condition of the LP31 mode. In the case of the design considering the theoretical cutoff, as shown in NPL 4, at the intersection point P7T between CLP31T and LLP02, the effective area can be maximized and low loss can be expected at a core radius of 7.5 µm and a relative refractive index difference of Δ0.67%. On the other hand, in the case of the design considering the effective cutoff, the core radius can be increased and the relative refractive index difference can be reduced, so at the intersection point P7E between CLP31E and LLP02, the effective area can be maximized and low loss can be expected at a core radius of 10.5 µm and a relative refractive index difference of Δ0.45%.

Figure 8:
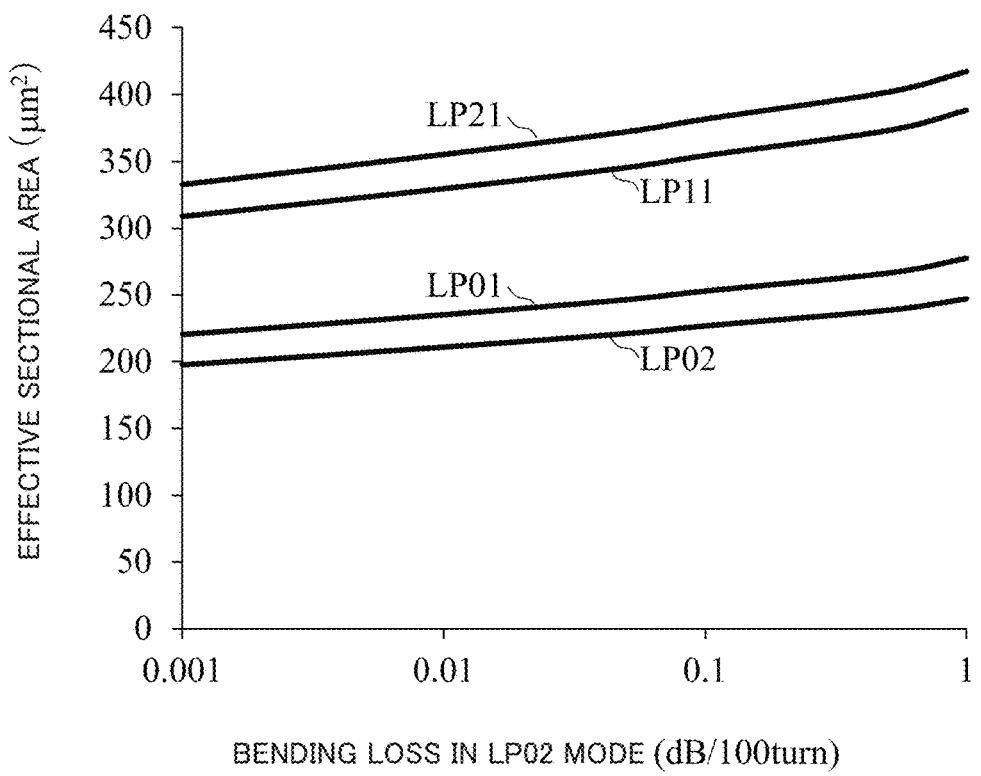
FIG. 8 is a diagram for explaining the bending loss of the LP02 mode of the 4LP mode fiber and the effective area of each mode.

FIG. 8 shows the relationship between the bending loss in the LP02 mode of the 4LP mode fiber and the effective area at the wavelength of 1550 nm in each mode. It is understood that the effective areas of the LP11 mode and the LP21 mode are larger than those of the LP01 mode and the LP02 mode. It can be understood that the effective area varies according to the required bending loss. In this case, with reference to the recommendation of ITU-TG652, the wavelength is 1565 nm, the bending radius R=30 mm, and 0.1 dB/100 turns or less.

Third Embodiment

Figure 9:
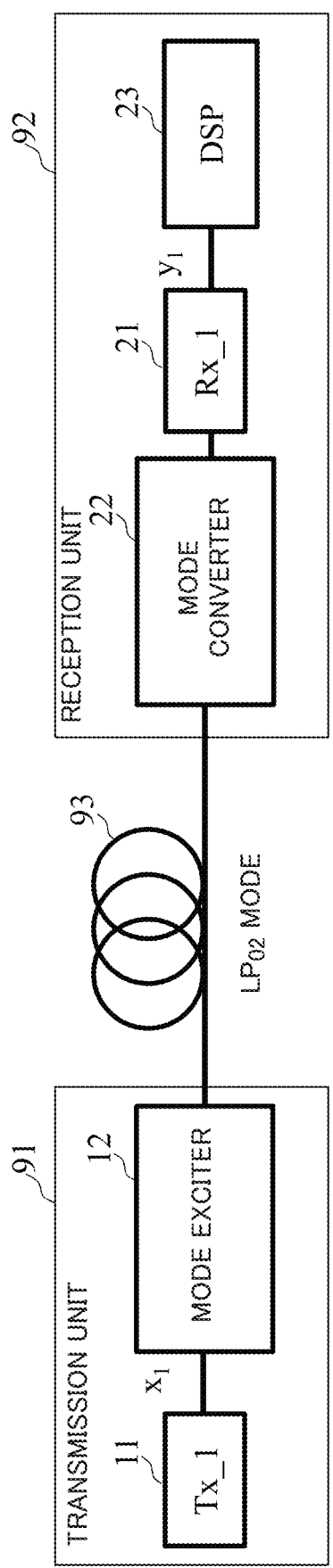
FIG. 9 is a diagram for explaining an optical transmission system in a case where a signal is carried in the LP02 mode according to a third embodiment.

FIG. 9 shows an optical transmission system for the LP02 mode according to the present embodiment. In the optical transmission system shown in FIG. 9, a transmission unit 91 and a reception unit 92 are connected by an optical transmission line 93. The transmission unit 91 places the channel transmitted by the transmitter (Tx) 11 in the LP02 mode by using the mode exciter 12 for exciting the LP02 mode. The optical transmission line 93 is, for example, a step index core fiber and transmits the signal light of the LP02 mode. After transmission, a mode converter 22 of the reception unit 92 converts the LP02 mode into the LP01 mode which is the fundamental mode, and inputs it to a receiver (Rx) 21 which is a single-mode device. The digital signal processing unit (DSP) 23 restores one signal (x1) by using one received signal (y1).

Figure 10:
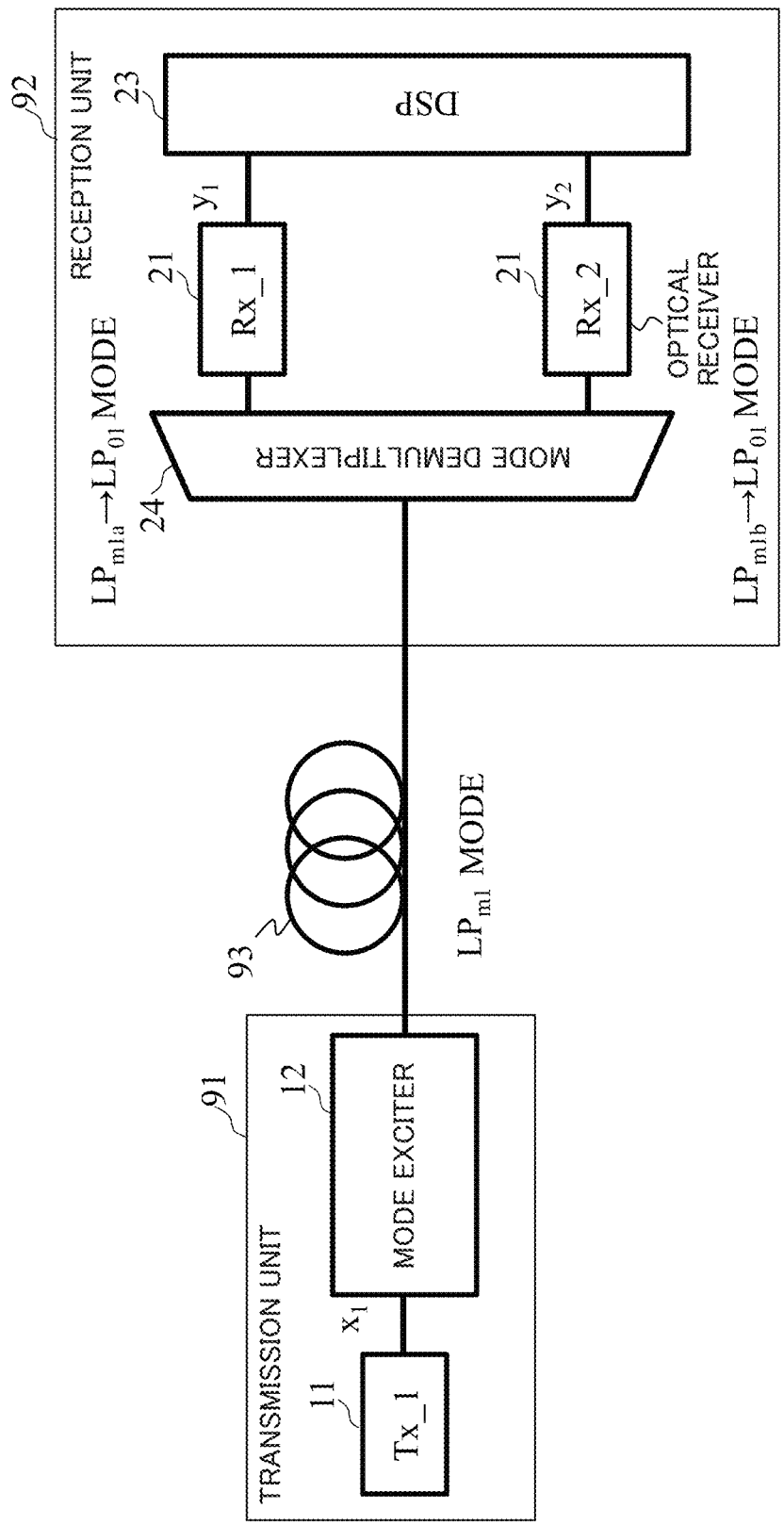
FIG. 10 is a diagram for explaining an optical transmission system in a case where a signal is carried in the LPm1 mode according to the third embodiment.

On the other hand, FIG. 10 shows an optical transmission system for the LPm1 mode according to the present embodiment. The optical transmission system shown in FIG. 10 includes a reception unit 92 in which a plurality of receivers 21 are connected in parallel. A signal is carried in the LPm1 mode by the mode exciter 12 for the LPm1 mode. On the other hand, since the LPm1 mode has two degenerate modes, that is, the LPm1a mode and the LPm1b mode, along with the propagation of the optical transmission line 93, the reception unit 92 needs a mode demultiplexer 24 that converts the LPm1a mode and the LPm1b mode into the LP01 mode which is the fundamental mode. The reception unit 92 includes a mode demultiplexer 24 and a single-mode device. In digital signal processing, one signal (x1) is restored using two received signals (y1, y2). By using two received signals, there is an effect of improving the signal quality.

Figure 11:
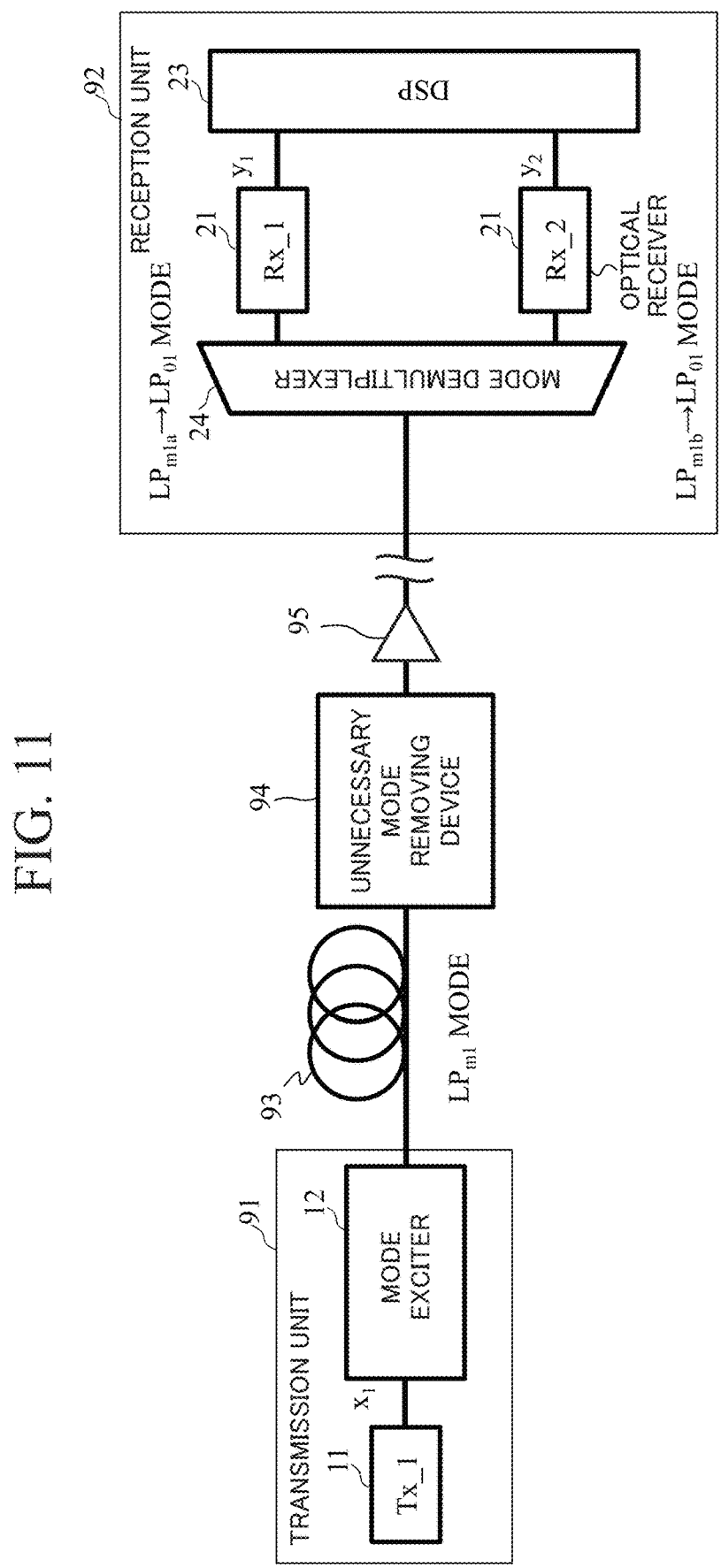
FIG. 11 shows a modification example of the optical transmission system illustrated in FIG. 10, and is a diagram for explaining an optical transmission system including an unnecessary mode removing device and an optical amplifier in a case where a signal is carried in the LPm1 mode.

FIG. 11 shows a modification example of the optical transmission system, and shows an optical transmission system including an unnecessary mode removing device and an optical amplifier in a case where a signal is carried in the LPm1 mode. In the present modification example, an unnecessary mode removing device 94 and an optical amplifier 95 are provided in that order between the optical transmission line 93 and the mode demultiplexer 24 of the optical transmission system shown in FIG. 10. The unnecessary mode removing device 94 is, for example, a device that removes unnecessary modes such as the LP01 mode and the LP02 mode. As the unnecessary mode removing device 94, for example, a long period fiber grating or a ring core fiber can be used.

The long period fiber grating can remove unnecessary modes by converting unnecessary modes into cladding modes. In the ring core fiber, unnecessary modes can be removed by causing an LP0n mode (n is an integer of 1 or more) such as the LP01 mode having an electric field at the center and a loss at the connection point and in the fiber. The optical amplifier 95 amplifies the signal light of the LPm1 mode having passed through the unnecessary mode removing device 94. The light intensity of the LPm1 mode is amplified using the NPL 11 as the optical amplifier 95. With the above configuration, unnecessary modes are removed from the signal light transmitted through the optical transmission line 93 by the unnecessary mode removing device 94, and the signal light is amplified by the optical amplifier 95. On the other hand, since the LPm1 mode has two degenerate modes, that is, the LPm1a mode and the LPm1b mode, along with the propagation of the optical transmission line, the reception unit 92 needs a mode demultiplexer 24 that converts the LPm1a mode and the LPm1b mode into the LP01 mode which is the fundamental mode. The receiver 92 includes a mode demultiplexer 24 and a single-mode device. In digital signal processing, one signal (x1) is restored using two received signals (y1, y2). By using two received signals, there is an effect of improving the signal quality.

Figure 12:
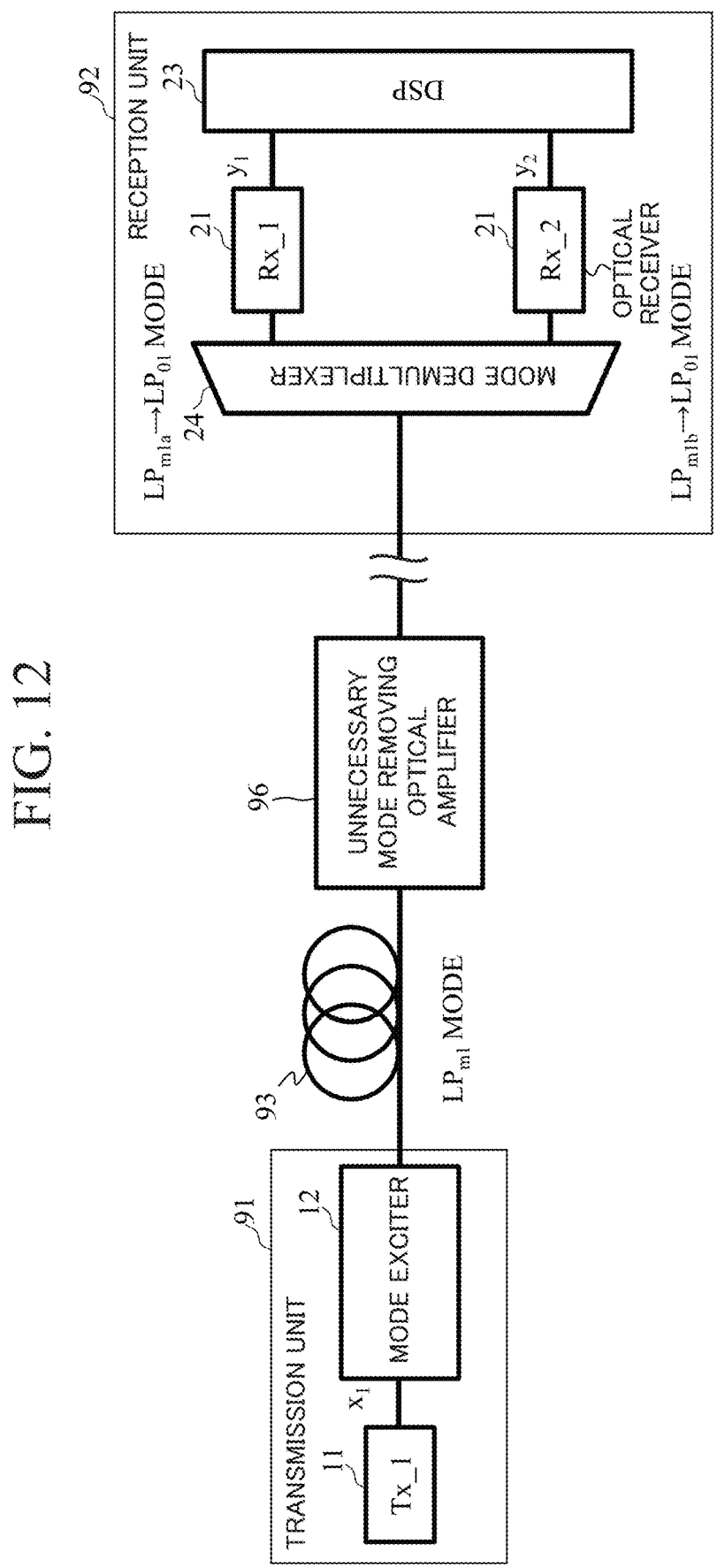
FIG. 12 shows a modification example of the optical transmission system illustrated in FIG. 10, and is a diagram for explaining an optical transmission system in which an optical amplifier has an unnecessary mode removing function in a case where a signal is carried in the LPm1 mode.

FIG. 12 shows a modification example of the optical transmission system, and shows an optical transmission system including an optical amplifier having an unnecessary mode removing function in a case where a signal is carried in the LPm1 mode. In the present modification example, an optical amplifier 96 having an unnecessary mode removing device is provided between the optical transmission line 93 and the mode demultiplexer 24 of the optical transmission system shown in FIG. 10. In order to amplify only the LPm1 mode, the optical amplifier 96 maximizes the gain of the LPm1 mode by setting the excitation light to the LPm1 mode, and does not give a gain to an unnecessary mode (for example, the LP01 mode or the LP02 mode), thereby removing the unnecessary mode. Further, it is possible to give a large gain only to the LPm1 mode, by making the refractive index distribution of the erbium-doped fiber in the optical amplifier 96 into the ring core shape and doping the ring shape with erbium.

Figure 13:
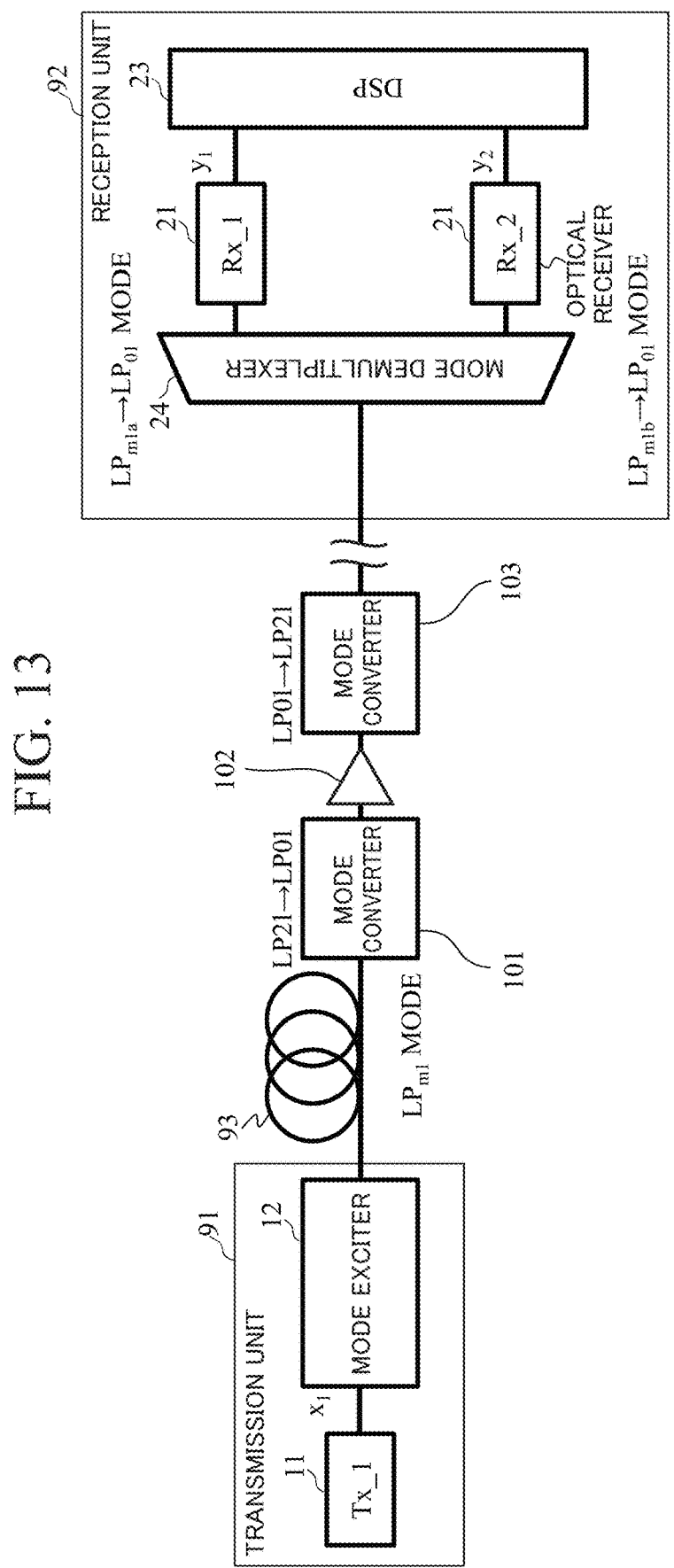
FIG. 13 shows a modification example of the optical transmission system illustrated in FIG. 10, and is a diagram for explaining an optical transmission system including a mode converter and a single-mode optical amplifier in a case where a signal is carried in the LPm1 mode.

FIG. 13 shows a modification example of the optical transmission system, and shows an optical transmission system including a mode converter and a single-mode optical amplifier in a case where a signal is carried in the LPm1 mode. In the present modification example, a mode converter 101, an optical amplifier 102, and a mode converter 103 are provided in that order between the optical transmission line 93 and the mode demultiplexer 24 of the optical transmission system shown in FIG. 10.

The mode converter 101 converts the signal light of the LPm1 mode into the LP01 mode which is the fundamental mode. The optical amplifier 102 amplifies the signal light converted into the LP01 mode by the mode converter 101. The mode converter 103 again converts the signal light of the LP01 mode amplified by the optical amplifier 102 into the LPm1 mode. In the present modification example, because the existing LP01 mode amplifier can be used, an inexpensive system can be provided. At the time of conversion to the LP01 mode, because only the specific LPm1 mode is converted into the LP01 mode, it is possible to remove unnecessary modes (for example, LP01 mode and LP02 mode) before conversion. Since there are two degenerate modes, that is, the LPm1a mode and the LPm1b mode, along with the propagation of the optical transmission line, the mode converter 101 has a function of converting the LPm1a mode into the LP01 mode and the LPm1b mode into the LP01 mode. The mode converter 103 at the subsequent stage of the optical amplifier 102 has a function of converting the LP01 mode to the LPm1a mode and converting the LP01 mode to the LPm1b mode.

Figure 14:
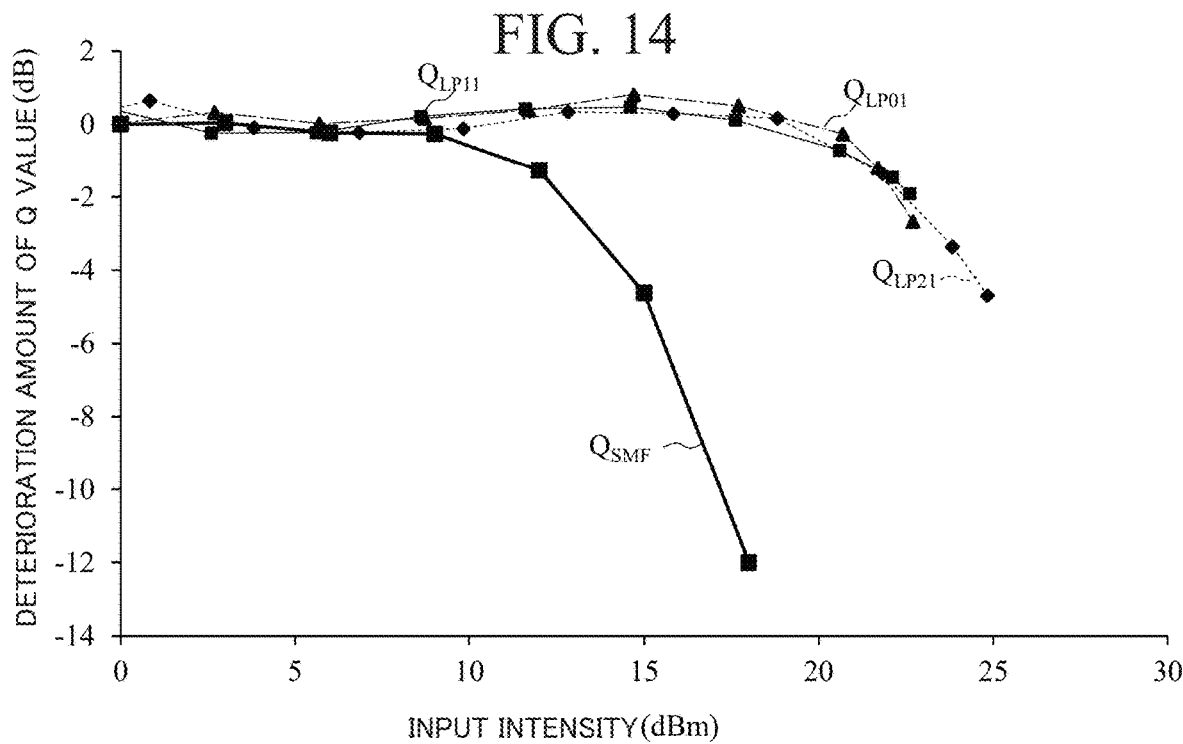
FIG. 14 is a diagram for explaining the deterioration amount of the signal quality Q value with respect to the input intensity when the LP01 mode, the LP11 mode, and the LP21 mode are input to the prototype 4LP mode fiber according to the third embodiment and the deterioration amount of the signal quality Q value with respect to the input intensity of the single-mode fiber in the related art.

FIG. 14 shows an example of the deterioration amount of the signal quality Q value with respect to the input intensity. QLP01, QLP11, and QLP21 indicate deterioration amounts of the signal quality Q value with respect to the input intensity in a case where the LP01 mode, the LP11 mode, and the LP21 mode are input to the prototype 4LP mode fiber according to the present disclosure, respectively. QSMF indicates the deterioration amount of the signal quality Q value with respect to the input intensity of the single-mode fiber.

Each mode is selectively excited by using 40 Gbps QPSK for the transmitter 11 and a spatial mode multiplexer for the mode exciter 12. The optical transmission line 93 is a prototype 4LP mode fiber. Each mode is converted and demultiplexed into the fundamental mode by the spatial mode demultiplexer 24. The receiver 21 is a digital coherent receiver, takes digital data acquired by a real-time oscilloscope into a personal computer, and demodulates a signal by the DSP 23 configured with an FIR filter offline. By performing demultiplexing with a high mode extinction ratio, it is possible to reduce the load of the DSP 23 that compensates for the modal crosstalk, and the number of taps of the FIR filter constituting the DSP 23 is suppressed to 28, which is the same level as that in the single-mode fiber transmission system in the related art. The fiber length is 38.2 km.

In the QSMF in the case of the single-mode fiber, the signal quality degrades due to a nonlinear phenomenon at an input intensity of 9 dBm or more, but it is understood that the signal quality does not degrade at the input intensity of 18 dBm or more, and the input intensity tolerance is large, in the LP21 mode, the LP11 mode, and the LP01 mode of the 4LP mode fiber according to the present embodiment. Thus, it is understood that the nonlinearity is lower as compared with the single-mode fiber.

As described above, by designing an optical fiber for the LP21 mode using a mode multiplexer capable of selectively exciting the mode and placing and propagating a signal in the propagation mode, as compared with the single-mode fiber, it is possible to increase the input intensity, and it can be expected to be extended without relaying.

In addition to the degenerate modes, each mode has two polarization modes (x polarization, y polarization) and can carry signals, and thus two or more signals may be simultaneously propagated.

Fourth Embodiment

Figure 15:
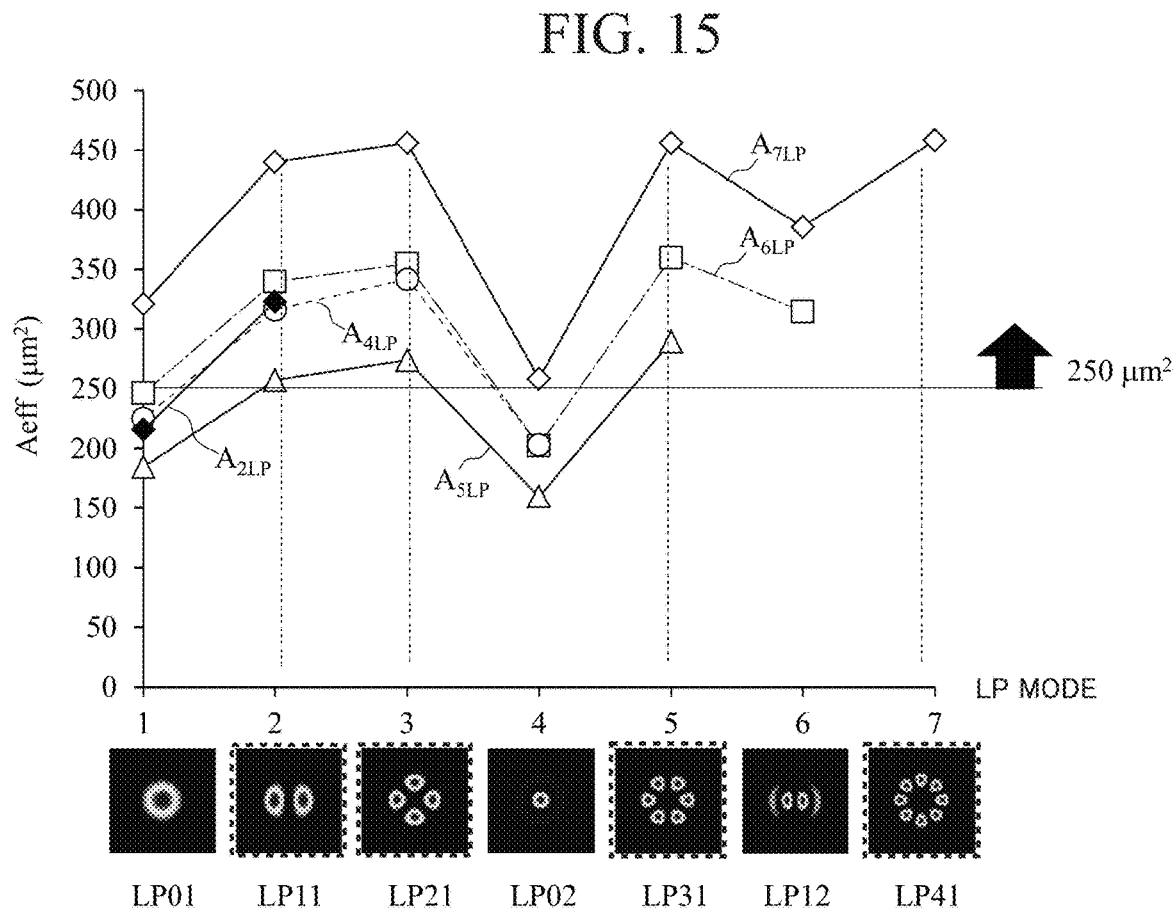
FIG. 15 is a diagram for explaining the number of LP modes to be propagated and the effective area of each mode in the optimum structure according to a fourth embodiment.

FIG. 15 shows an example of the effective area of each mode in the optimum structure of each of the multi-mode fibers shown in the first embodiment. A2LP, A4LP, A5LP, A6LP, and A7LP represent cases of 2LP mode, 4LP mode, 5LP mode, 6LP mode, and 7LP mode, respectively. Focusing on the LPm1 mode (m is an integer of 1 or more), it is understood that the effective area is larger as compared with the other modes, and 250 $\mu m^2$ or more is also possible for the 5LP mode design. In other words, these modes can be expected to be less nonlinear than other modes.

Figure 16:
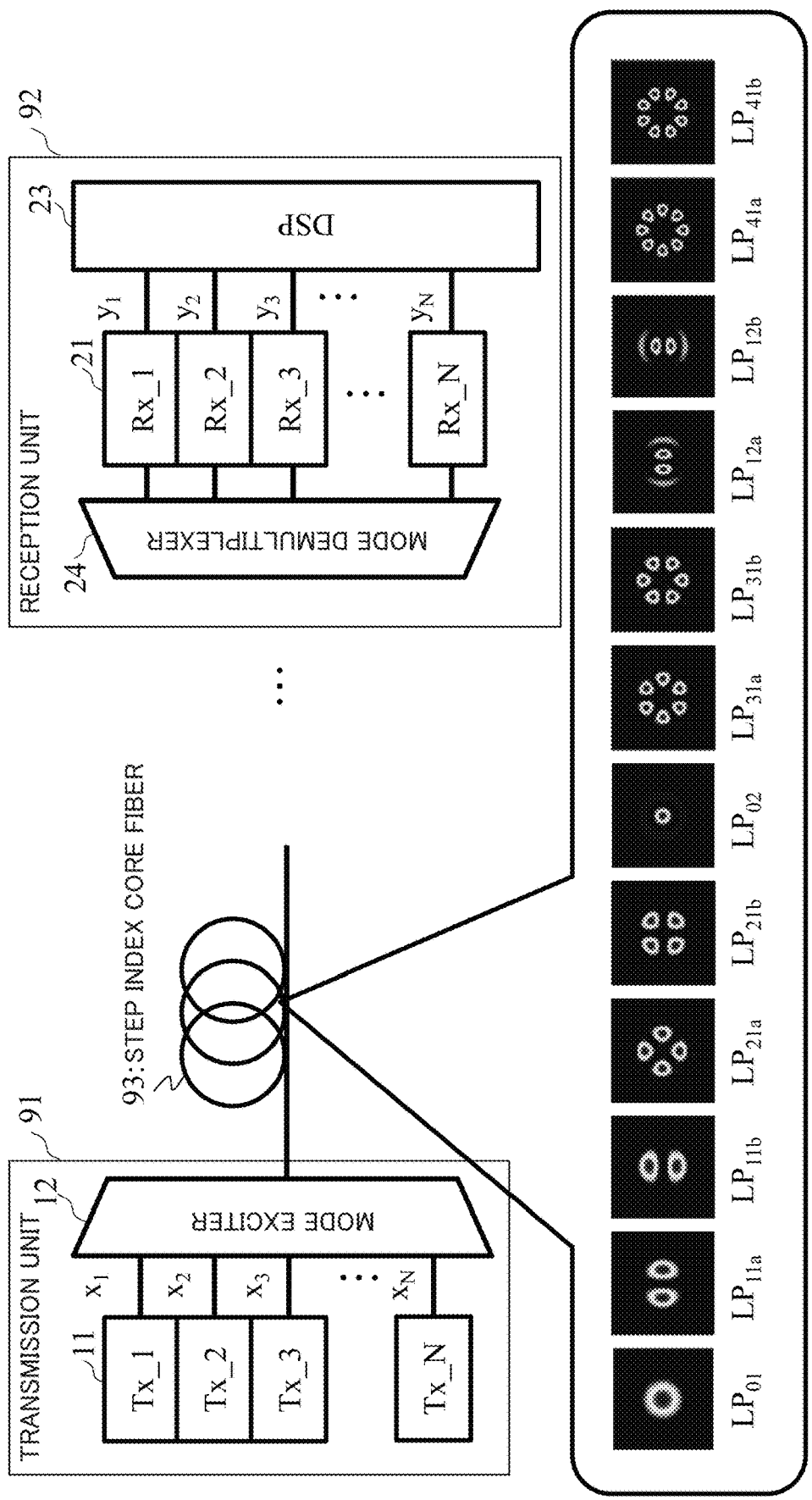
FIG. 16 is a diagram for explaining an optical transmission system in which a step index optical fiber optimally designed for the LPm1 mode according to the fourth embodiment is used as a transmission line.

FIG. 16 shows an example of an optical transmission system in which a step index optical fiber optimally designed for the LPm1 mode according to the present disclosure is used as the optical transmission line 93.

The transmission unit 91 includes N transmitters 11 (N is an integer of 2 or more) that transmit signal light with N single-mode optical fibers, and a mode exciter 12 that excites and multiplexes only the LPm1 mode (m is an integer of 1 or more). The mode exciter 12 excites N signal lights into N modes and is coupled to the optical fiber. The mode exciter 12 and the mode demultiplexer 24 are connected by an optical transmission line 93. The reception unit 92 includes a mode demultiplexer 24 that converts the N LPm1 modes propagating through the optical transmission line 93 into N fundamental modes and performs demultiplexing, N receivers 21 that receive respective signal lights demultiplexed by the mode demultiplexer 24, and a DSP 23.

As the optical fibers used for the optical transmission line 93, the 2LP mode fiber, the 4LP mode fiber, the 5LP mode fiber, the 6LP mode fiber, and the 7LP mode fiber described in the first embodiment are used. The LP11 mode is used in the case of the 2LP mode fiber, the LP21 mode is used in the case of the 4LP mode fiber, the LP31 mode is used in the case of the 5LP mode fiber and the 6LP mode fiber, and the LP41 mode is used in the case of the 7LP mode fiber.

The LP11 or LP21 mode may be used in the case of the 4LP mode fiber and the 5LP mode fiber, any one of the LP11 mode, the LP21 mode, and the LP31 mode may be used in the case of the 6LP mode fiber, and any one of the LP11 mode, the LP21 mode, the LP31 mode, and the LP41 mode may be used in the case of the 7LP mode fiber.

Since the degenerate mode is present in the LPm1 mode, the LP11a and LP11b modes can be used for the LP11 mode, the LP21a and LP21b modes can be used for the LP21 mode, the LP31a and LP31b modes can be used for the LP31 mode, and the LP41a and LP41b modes can be used for the LP41 mode. In this case, as shown in NPLs 2 and 3, the mode multiplexer and demultiplexer that multiplex and demultiplex the degenerate mode are necessary. Although mode coupling occurs between these degenerate modes, the DMD between degenerate modes is small, and therefore suppressing modal crosstalk between LP modes does not lead to an increase in DSP load.

By using these modes, large capacity and long distance transmission is possible compared with a single-mode fiber.

Advantageous Effects of Invention

As described above, the optical transmission system according to the present embodiment carries a signal in modes with low loss, low nonlinearity, and low crosstalk by using a step index core optical fiber optimized to propagate an LPm1 mode (m is an integer of 1 or more) as a transmission line, and a mode multiplexer and demultiplexer with a high mode extinction ratio, so that long distance and large capacity transmission can be realized.

Although several preferred embodiments have been described above, the present disclosure is not limited to these embodiments and modification examples thereof. Additions, omissions, substitutions, and other changes in the structure are possible without departing from the spirit of the present disclosure.

The present disclosure is not limited by the foregoing description, but only by the scope of the appended claims.

INDUSTRIAL APPLICABILITY

According to the present disclosure, it is possible to realize optical fiber transmission of a large capacity and long distance by utilizing a higher order mode of the fiber.

REFERENCE SIGNS LIST

11: Tx
12: MODE EXCITER
21: Rx
22: MODE CONVERTER
24: MODE DEMULTIPLEXER
23: DSP
91: TRANSMISSION UNIT
92: RECEPTION UNIT
93: OPTICAL TRANSMISSION LINE

What is claimed is:

1. An optical fiber comprising:
a core of pure silica,
wherein a refractive index distribution of a clad with respect to the core is a step index type;
wherein the optical fiber has a predetermined V value at which an LPm1 mode (m is an integer of 1 or more) is propagated;
wherein m is 1 and the predetermined V value is greater than 3.8 and less than 4.3, or
wherein m is 2 and the predetermined V value is greater than 5.1 and less than 5.8, or
wherein m is 3 and the predetermined V value is greater than 6.3 and less than 7.1, or
wherein m is 4 and the predetermined V value is greater than 7.1 and less than 7.8; and
wherein an effective area is 200 $\mu m^2$ or more.

2. The optical fiber according to claim 1, wherein the predetermined V value is determined based on an effective refractive index difference of a lowest order mode among unnecessary modes.

3. An optical transmission system comprising:
an optical transmitter which transmits signal light;
a mode exciter which excites the signal light to an LPm1 (m is an integer of 1 or more) mode;
a transmission line which includes the optical fiber according to claim 1 that propagates the signal light of the LPm1 mode;
a mode demultiplexer which demultiplexes two degenerate modes of the LPm1 mode and converts the degenerate modes into fundamental modes; and
an optical receiver which receives signal lights of the respective demultiplexed fundamental modes.

4. An optical transmission system comprising:
N (N is an integer of 2 or more) optical transmitters which transmit signal light with N single-mode optical fibers;
a mode multiplexer which excites signal light from each of the optical transmitters into N different modes among LPm1 (m is an integer of 1 or more) modes and multiplexes the signal light of each mode;
a transmission line which includes the optical fiber according to claim 1 that propagates a multiplexed signal from the mode multiplexer;
a mode demultiplexer which converts the N LPm1 modes propagating through the transmission line into N fundamental modes and performs demultiplexing; and
an optical receiver which receives signal lights of the respective demultiplexed fundamental modes.

* * * * *